United States Patent [19]

Tamazawa et al.

[11] Patent Number: 5,007,307
[45] Date of Patent: Apr. 16, 1991

[54] POWER PLANT FOR VEHICLES

[75] Inventors: Tsuyoshi Tamazawa, Yokohama; Yoshimasa Hayashi, Kamakura, both of Japan

[73] Assignee: Nissan Motor Co., Ltd., Yokohama, Japan

[21] Appl. No.: 343,214

[22] Filed: Apr. 26, 1989

[30] Foreign Application Priority Data

Apr. 26, 1988 [JP] Japan .................. 63-101354

[51] Int. Cl.⁵ .................................. F16H 57/02
[52] U.S. Cl. .................. 74/606 R; 123/192 B; 123/195 C
[58] Field of Search .......... 74/606 R; 123/192 B, 123/195 C, 198 P; 92/147, 261

[56] References Cited

U.S. PATENT DOCUMENTS

| | | | |
|---|---|---|---|
| 4,441,378 | 4/1984 | Ponczek | 74/606 R X |
| 4,457,187 | 7/1984 | Tsuboi | 74/606 R X |
| 4,468,979 | 9/1984 | Inagaki et al. | 74/606 R |
| 4,573,366 | 3/1986 | Kennard | 74/606 R X |
| 4,606,310 | 8/1986 | Makino | 123/195 C X |
| 4,666,015 | 5/1987 | Matsuda et al. | 74/606 R X |
| 4,823,632 | 4/1989 | Harrod et al. | 74/606 R X |
| 4,829,850 | 5/1989 | Soloy | 74/606 R X |

OTHER PUBLICATIONS

"Kawasaki KZ1300 Service Manual 5th Edition", p. 109, published by Kawasaki Heavy Industries, Ltd., on Aug. 9, 1985.

*Primary Examiner*—Vinh T. Luong
*Attorney, Agent, or Firm*—Foley & Lardner

[57] ABSTRACT

A cylinder block is detachably connected to a transmission casing so that an engine and a transmission constitutes a single unit. A crankshaft is entirely supported on the cylinder block. A crankshaft gear is installed on the crankshaft at the nearly central portion thereof. An intermediate shaft with an idler gear and an idler shaft with an input gear are entirely supported on the transmission casing in such a way that the idler gear and input gear are meshed with each other. The crankshaft gear and idler gear are automatically meshed with each other when the cylinder block is installed in place on the transmission casing.

10 Claims, 6 Drawing Sheets

POWER PLANT FOR VEHICLES

BACKGROUND OF THE INVENTION

1. Field of the Invention

The present invention relates in general to power plants for vehicles such as automobiles and more particularly to a vehicular power plant of the kind having an engine and a transmission which are joined to constitute a single unit.

2. Description of the Prior Art

An example of a prior art vehicular power plant of the above described kind is disclosed in "KAWASAKI KZ1300 Service Manual 5th Edition", page 109, published by Kawasaki Heavy Industries, Ltd. on Aug. 9, 1985 and also shown in FIGS. 5 and 6.

Referring to FIGS. 5 and 6, a power plant includes an engine 50 and a transmission 52 which are connected in parallel to constitute a single unit. Power of the engine 50 is transferred to the transmission 52 through a chain 54 interconnecting a crankshaft sprocket 56 and an idler sprocket 58 which are respectively installed on a crankshaft 60 and an intermediate shaft 62 and through a chain 64 interconnecting an idler sprocket 66 and an input sprocket 68 which are respectively installed on the intermediate shaft 62 and an input shaft 70. The crankshaft 60, intermediate shaft 62 and input shaft 70 is journalled in bearing bores or saddles 72 formed in the lower surface of a cylinder block 74 and bearing caps 76 formed in the upper surface of a transmission casing 78.

With the prior art power plant, the crankshaft 60, intermediate shaft 62 and input shaft 70 are journalled at the joint between the cylinder block 74 and transmission casing 78. Due to this, in assembly of the power plant, it is necessary to install the cylinder block 74 on the transmission casing 78 while holding the crankshaft 60 around which the chain 54 is placed together with the cylinder block 74, and it is also necessary, at the time of fastening the cylinder block 74 to the transmission casing 78, to install the intermediate shaft 62 and input shaft 70 in position while placing the chain 64 around them. This results in a difficult assembly operation and therefore a long assembling time of the power plant.

On the contrary, upon removal of the engine 50 or transmission 52 for its service, it is necessary to remove the intermediate shaft 62, input shaft 70 and chains 54, 64. As a result, it takes a considerable time to have the engine 50 or transmission 52 checked and serviced. Furthermore, the service work of the engine 50 or transmission 52 cannot be done with ease due to a number of constitutent parts which are inevitably removed upon removal of the engine 50 or transmission 52.

SUMMARY OF THE INVENTION

In accordance with the present invention, there is provided an improved power plant for a vehicle. The power plant comprises an engine having a cylinder block, a transmission arranged in a parallel relation to the crankshaft and a transmission casing, an input shaft arranged in parallel with the casing, an intermediate shaft interposed parally between the input shaft and the crankshaft and supported on the transmission casing, a crankshaft gear installed on a nearly central portion of the crankshaft, an input gear installed on the input shaft, and an idler gear installed on the intermediate shaft and meshing with the crankshaft gear and the input gear. The cylinder block and transmission casing are formed as independent parts and detachably connected to each other.

The above structure is effective for overcoming the above noted disadvantages and shortcomings inherent in the prior art device.

It is accordingly an object of the present invention to provide an improved power plant for a vehicle which can be assembled with ease and therefore can reduce an assembling expense.

It is another object of the present invention to provide a power plant of the above described character which can be disassembled with ease and therefore makes it possible to have the power plant checked and serviced with ease.

It is a further object of the present invention to provide a power plant of the above described character which can be more compact in size and lighter in weight as compared with a comparable prior art power plant.

It is a further object of the present invention to provide a power plant of the above described character which has an improved durability and is quiet in operation.

DESCRIPTION OF THE PREFERRED EMBODIMENTS

Figure 1:
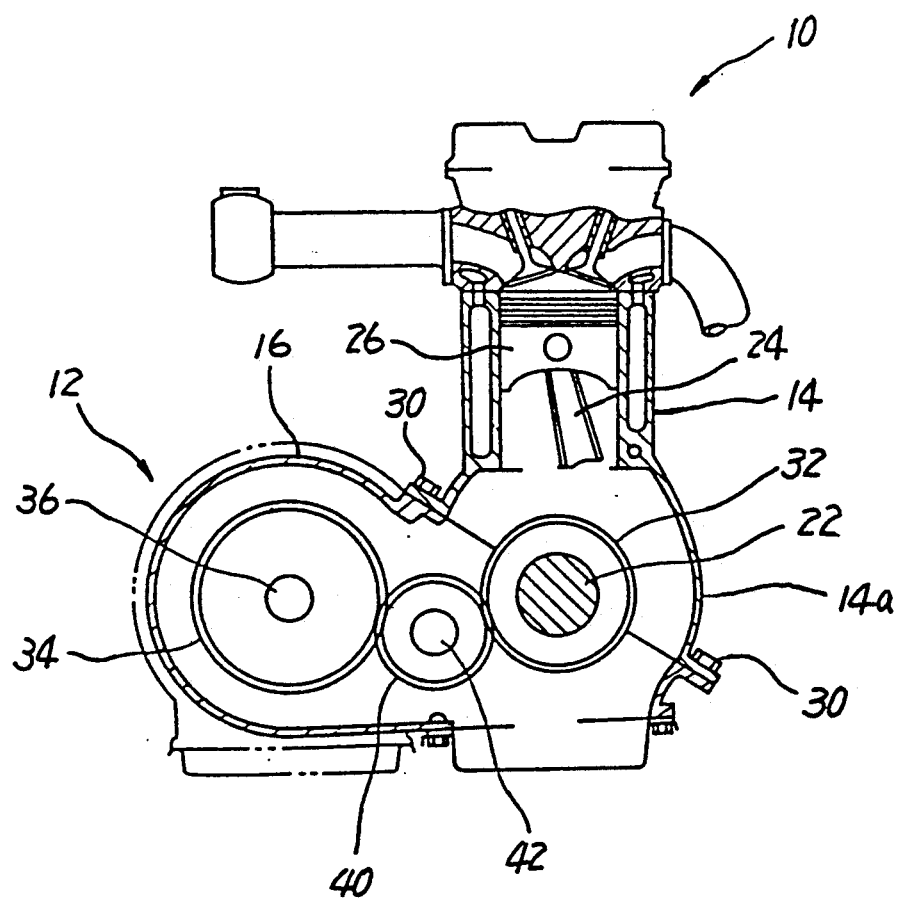
FIG. 1 is an elevational, partly sectioned view of a power plant according to an embodiment of the present invention.
Figure 2:
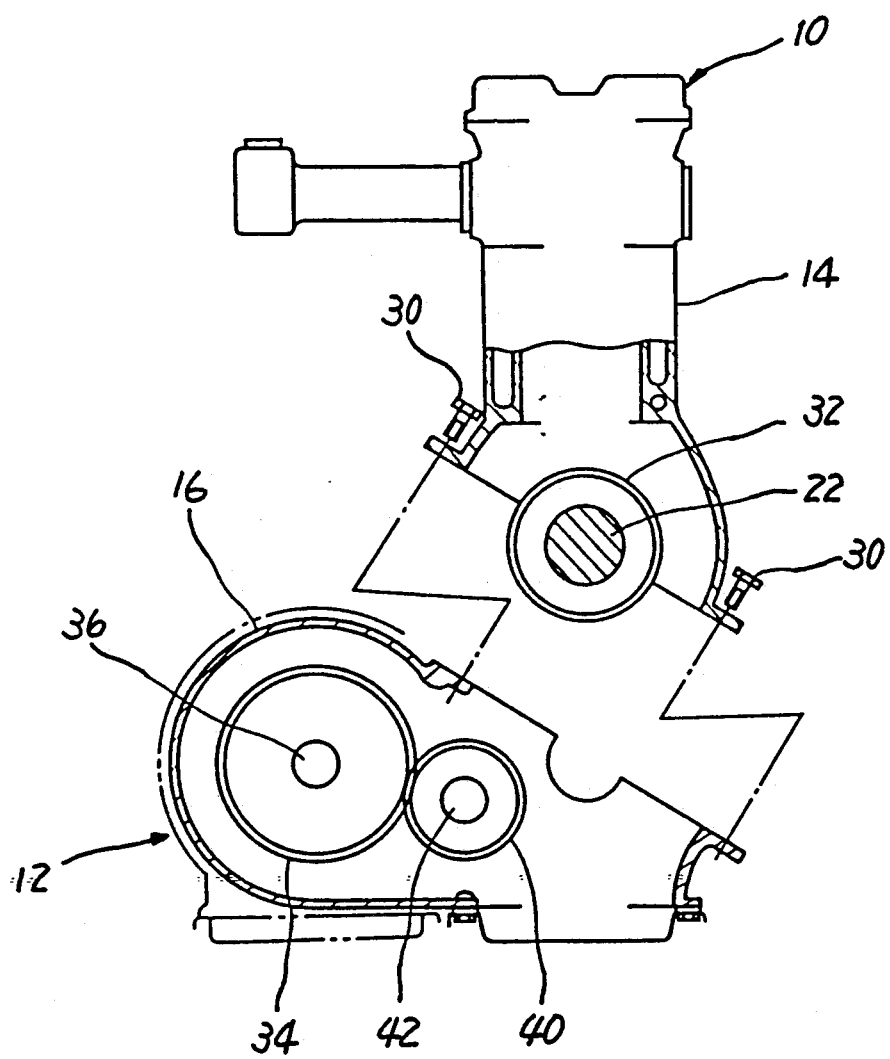
FIG. 2 is an exploded view of the power plant of FIG. 1.
Figure 3:
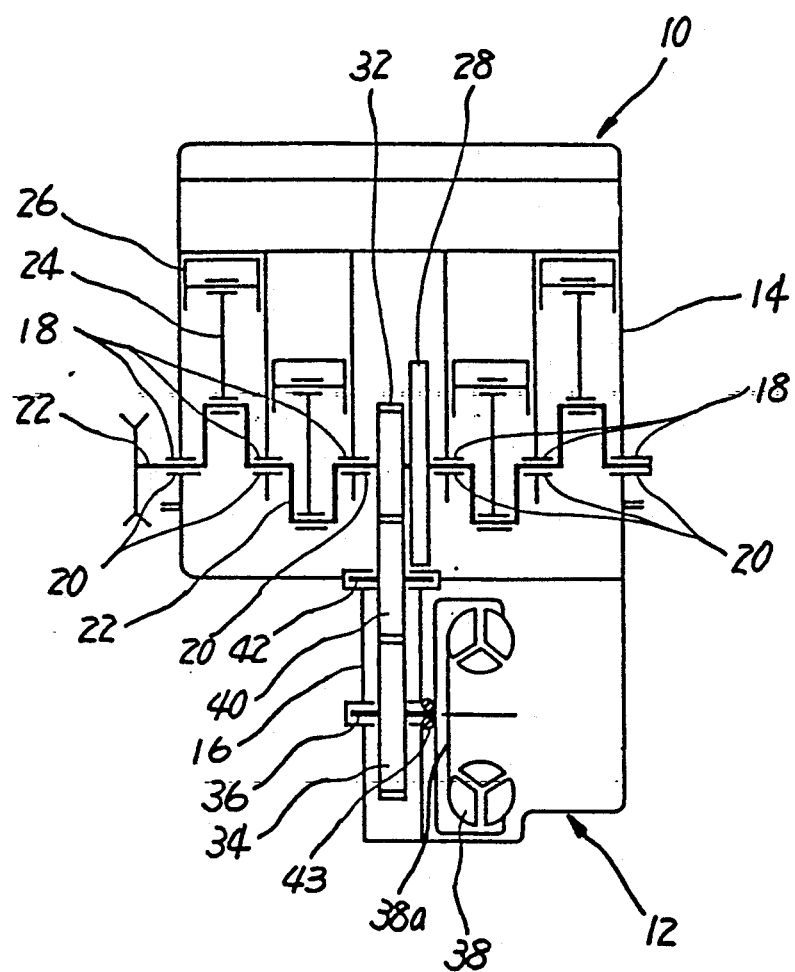
FIG. 3 is a diagramatic view of the power plant of FIG. 1 for illustration of its power train.

Referring to FIGS. 1 to 3, a power plant according to an embodiment of the present invention includes an engine 10 and a transmission 12 connected in parallel to constitute a single unit. The engine 10 includes a cylinder block 14, and the transmission 12 includes a transmission casing 16.

The cylinder block 14, as shown in FIG. 3, is formed with a plurality of main bearing bores or saddles 18 at the lower ends of the bulkheads coinciding with the lower end of the skirt portion 14a. A plurality of main bearing caps 20 are bolted to the bulkheads of the cylinder block 14 and cooperate with the main bearing saddles 18 to support by way of bearings (not shown) a crankshaft 22. The crankshaft 22 is connected to a plurality of connecting rods 24 to convert reciprocating motion of pistons 26 to rotation. A flywheel 28 is installed on the nearly central portion of the crankshaft 22. The cylinder block 14 is connected at the lower end of the skirt portion 14a to the transmission casing 16 with bolts 30.

A crankshaft gear 32 is installed on the crankshaft 22 at a nearly central portion thereof, i.e., near the flywheel 28. An input gear 34 is installed on ah input shaft 36 which is supported on the transmission casing 16 and connected to an input member 38a of a torque converter 38. An idler gear 40 is meshed with the crankshaft gear 32 and input gear 34 and installed on an intermediate shaft 42. The intermediate shaft 42 is arranged in parallel to the crankshaft 22 and the input shaft 36 and supported on the transmission casing 16. Power from the crankshaft 22 is transferred through the crankshaft gear 32, idler gear 40 and input gear 34 to the transmission 12 which are arranged in parallel to the crankshaft 22 of the engine 10.

In the above, further note that the flywheel 28 is installed on the nearly central portion of the crankshaft 28, i.e., installed on the crankshaft 22 in the place nearly equidistant from the opposite axial ends thereof. This is effective for increasing the structural strength of the crankshaft 22 considerably and therefore makes it possible to reduce the diameter of the crankshaft 22, i.e., the crankshaft 22 can be more compact in size and lighter in weight as compared with the comparable prior art crankshaft. Furthermore, such a light and compact crankshaft 22 can reduce the friction caused in sliding on the main bearings, thus making it possible to improve the durabilities of the crankshaft 22 of itself and the main bearings.

Further, note that power of the engine 10 is taken from the nearly central portion of the crankshaft 22. This is effective for further enhancing the above described effects.

Further, note that two main bearings are arranged on the opposite sides of the crankshaft gear 32 and adjacently to same. This is effective for further increasing the structral strength of the crankshaft 22.

In addition, with the exception of the provision of minimal support by gears 34 and 40, the crankshaft 22 is supported entirely on the cylinder block 14, i.e., supported only on the cylinder block 14, and the idler gear 40 and input gear 34 are entirely installed on the transmission casing 16, i.e., supported only on the transmission casing 16 in such a way that the crankshaft gear 32 is automatically meshed with the idler gear 40 when the cylinder block 14 is simply installed in place on the transmission casing 16. Easy and efficient assembly of the power plant thus can be attained. Further, one of the engine and transmission can be removed from the other with ease and without causing any additional parts to be inevitably removed in response to the above removal. Easy and efficient service of the power plant thus can also be attained.

Further note that the power plant is nearly axially symmetrical. This is effective for desiredly mounting the power plant on the vehicle body in such a way as to efficiently prevent vibrations of the engine from being transmitted to the vehicle body.

It is further to be noted that by providing a seal 43 to the joining portion between the input shaft 36 and the input member 38a of the torque converter 38 the idler gear 40, intermediate shaft 42, input gear 34, input shaft 36, etc. can be lubricated with engine oil since they are sealingly received within the space define by the cylinder block 14, and the transmission case 16.

Figure 4:
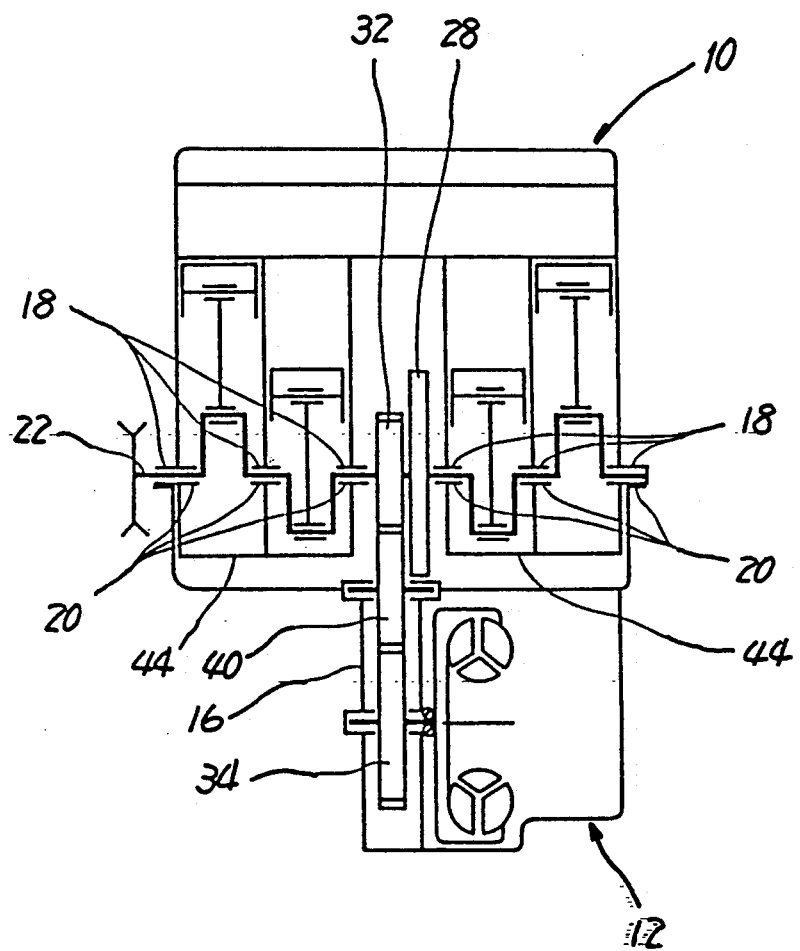
FIG. 4 is a view similar to FIG. 3 but shows another emboidment of the present invention.
Figure 5:
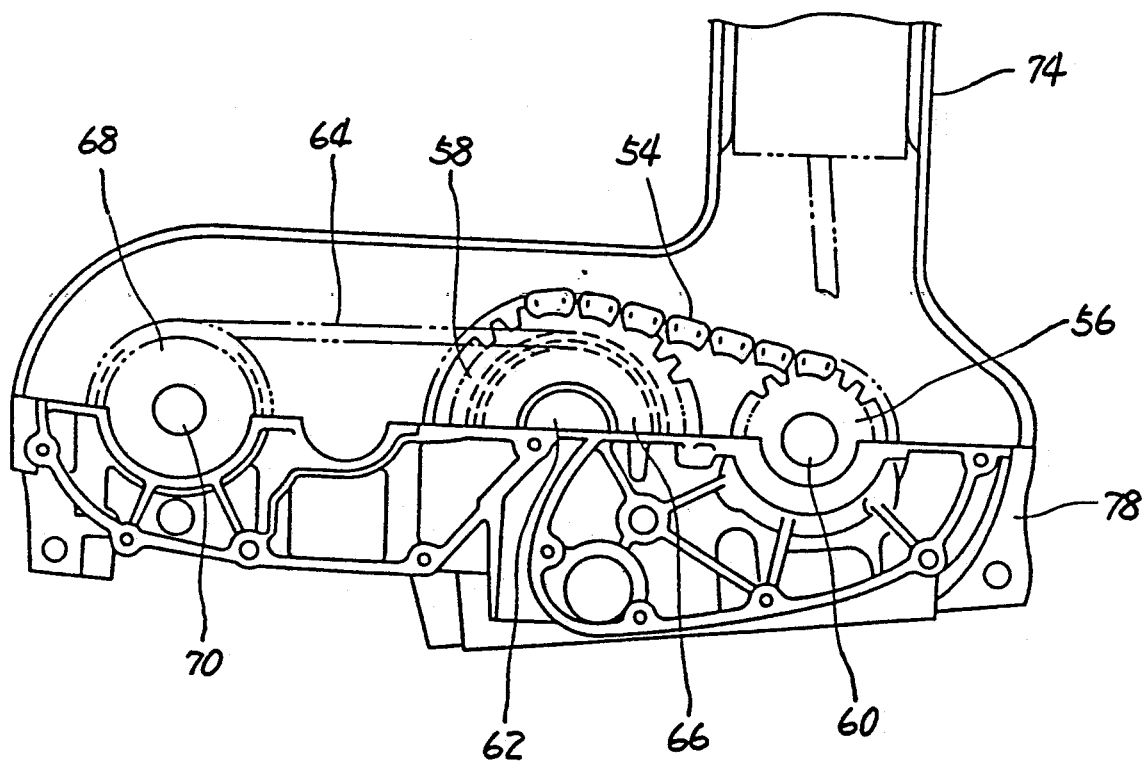
FIG. 5 is an elevational, partly sectioned view of a prior art power plant.
Figure 6:
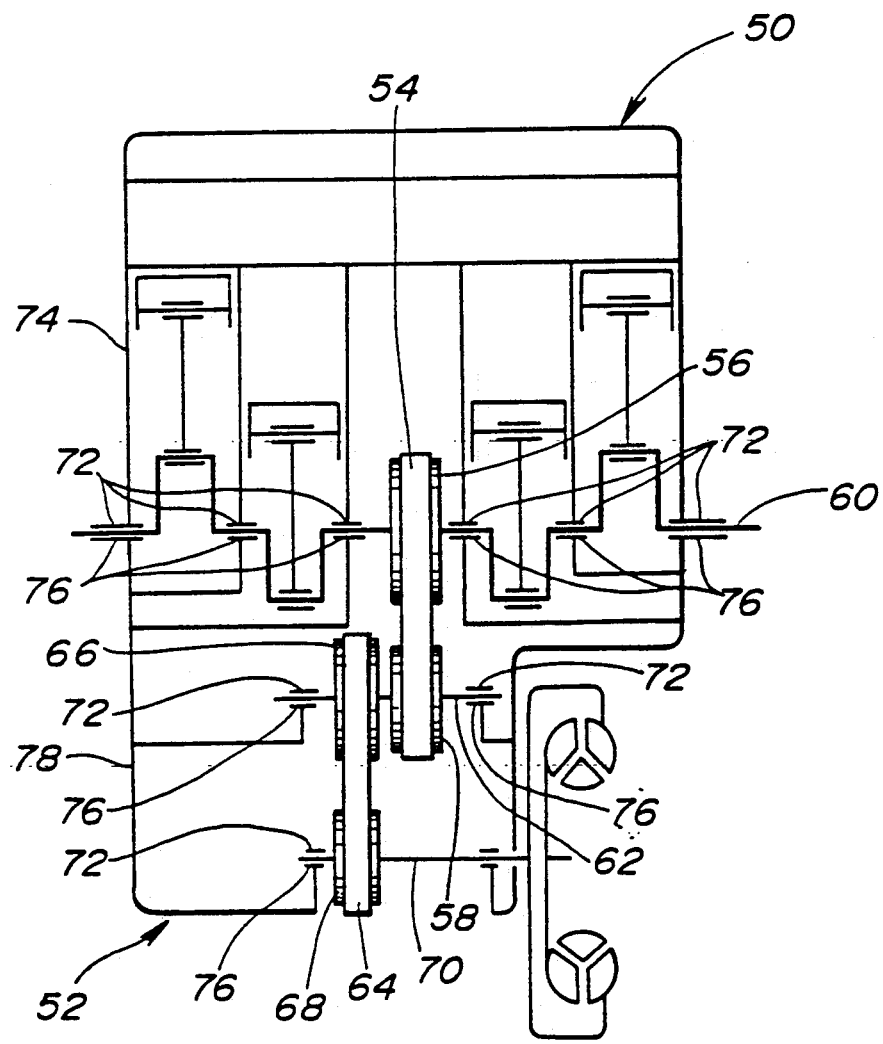
FIG. 6 is a diagramatic view of the power plant of FIG. 5 for illustration of its power train.

FIG. 4 shows another embodiment which is substantially similar to the previous embodiment except that a pair of bearing beams or reinforcement beams 44 are provided for rigidly interconnecting the bearing caps 76 into two groups.

With such a reinforcement beam 44, it becomes possible to rigidly hold the bearing caps 20 in place and increase the structural strength of the cylinder block 14, particularly the skirt portion 14a thereof, whereby to make it possible to reduce high-frequency engine noises.

In the above, it is to be noted that the provision of the reinforcement beams 44 does not cause any incovenience in assembly and disasssembly of the power plant. In this instance, the reinforcement beams 44 are not necessarily required to interconnect all of the bearing caps 20, but a single reinforcement beam 44 may interconnect the inner two bearing caps 22 which are subject to relatively large radial loads due to the interengagement of the crankshaft gear 32 and the idler gear 40.

What is claimed is:

1. A power plant for an automotive vehicle comprising:
   (A) a first independent unit comprising an engine having a cylinder block,
   a crankshaft supported on said cylinder block, and
   a crankshaft gear installed on said crankshaft;
   (B) a second independent unit comprising a transmission arranged in parallel with said crankshaft and including a transmission casing,
   an input shaft arranged in parallel with said crankshaft and supported on said transmission casing,
   an input gear installed on said input shaft,
   an intermediate shaft interposed parallelly between said input shaft and said crankshaft and supported on said transmission casing, and
   an idler gear which is installed on said intermediate shaft and which meshes with said crankshaft gear and said idler gear; and
   (C) means for detachably attaching said first unit to said second unit.

2. The power plant accordant to claim 1, in wherein said means for detachably attaching comprises fasteners which connect said cylinder block to said transmission casing.

3. The power plant according to claim 2, wherein said fasteners comprise bolts.

4. The power plant according to claim 2, wherein said engine comprises a multi-cylinder internal combustion engine, and wherein said cylinder block completely encloses said engine and said crankshaft.

5. The power plant according to claim 2, wherein said crankshaft gear and said idler gear are disengageable concurrently with detachment of one of said cylinder block and said transmission casing from the other.

6. The power plant according to claim 1, wherein said cylinder block further comprises a pair of main bearing means for supporting opposite end portions of said crankshaft gear, said crankshaft gear being installed on an intermediate portion of said crankshaft.

7. The power plant according to claim 6, further comprising a flywheel installed on said crankshaft at a location adjacent to said crankshaft gear and between said main bearing means.

8. The power plant according to claim 1, further comprising a plurality of bearing caps attached to said cylinder block for supporting said crankshaft and at least one reinforcement beam interconnecting at least some of said bearing caps.

9. The power plant according to claim 1, further comprising a plurality of bearing caps attached to said cylinder block for supporting said crankshaft and a pair of reinforcement beams interconnecting said bearing caps.

10. The power plant according to claim 1, further comprising a torque converter having an input member to which said input shaft is drivingly connected.

* * * * *